April 29, 1958    F. W. WEISSBORN, JR    2,832,195
"CROSS-IGNITION TUBE" ASSEMBLY FOR GAS
TURBINE COMBUSTION SYSTEM
Filed April 16, 1956
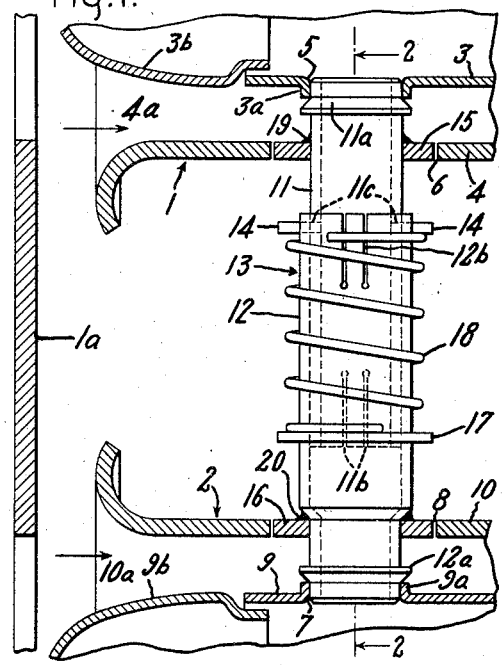
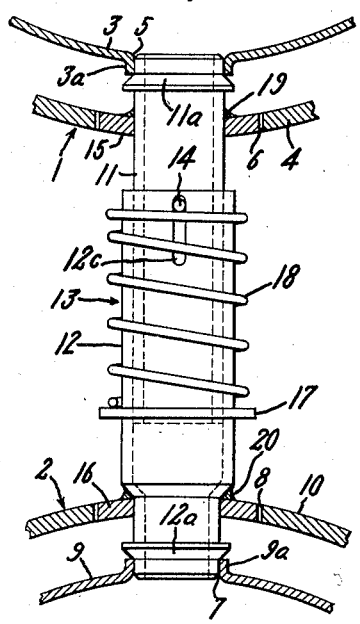
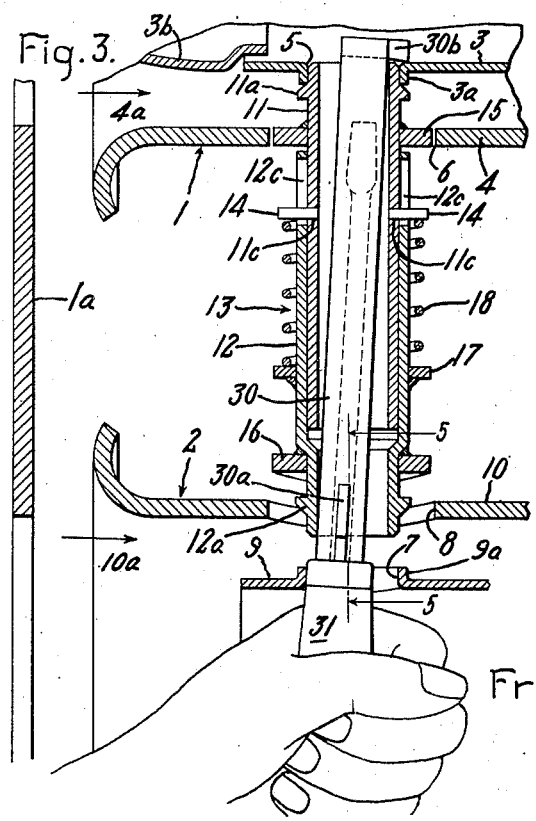
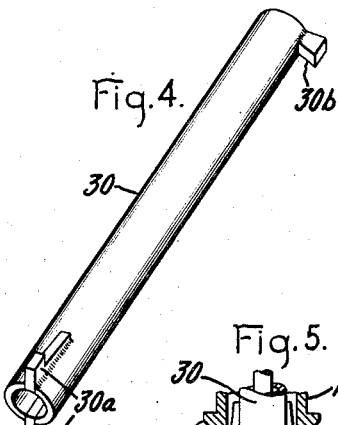
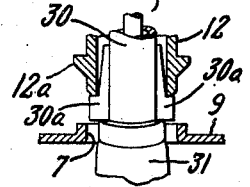
Inventor:
Frederick W. Weissborn Jr.
by    *Kiess*
His Attorney

United States Patent Office 2,832,195
Patented Apr. 29, 1958

2,832,195

"CROSS-IGNITION TUBE" ASSEMBLY FOR GAS TURBINE COMBUSTION SYSTEM

Frederick W. Weissborn, Jr., Scotia, N. Y., assignor to General Electric Company, a corporation of New York Application April 16, 1956, Serial No. 578,205

5 Claims. (Cl. 60—39.37)

This invention relates to a combustion system for a thermal powerplant and more particularly to a "cross-ignition tube" assembly for interconnecting adjacent combustors in a gas turbine.

A combustion system for a gas turbine normally includes a number of generally cylindrical and approximately parallel combustors disposed in an annular arrangement with each chamber supplying an arcuate portion of the annular nozzle of the turbine. Gas turbines of this general type and arrangement are disclosed, for instance, in the U. S. Patent to Alan Howard—2,548,886, issued April 17, 1951. It is common practice to interconnect the combustors by short conduits or "cross-ignition tubes," the purpose of which is to provide for ignition of the fuel in one chamber from that adjacent to it, so that a spark plug or the like need not be installed in each combustion chamber. The cross-ignition tubes also serve to some extent to equalize the pressures between the combustion chambers.

A conventional cross-ignition tube comprises a unitary tubular member extending between aligned openings in adjacent combustors which is firmly secured to the combustors by a bolt or other fastening means. The fastening means are normally located in a relatively inaccessible place between the combustors which increases the difficulty of assembly and disassembly of the tubes. Also, the tubes are subject to vibrations during operation of the turbine which results in a wearing away of the tube portion in contact with the combustor, necessitating repair or replacement of the tube. In addition, with this type of tube construction, the tubes cannot readily be retracted out of contact with the combustor to facilitate assembly and disassembly of he combustors.

Accordingly, it is an object of this invention to provide a cross-ignition tube assembly which is firmly secured in position without the use of auxiliary fastening devices, and which will not vibrate when installed in position between adjacent combustors.

A further object is to provide a cross-ignition tube assembly which can instantly be retracted and maintained out of contact with an adjacent combustor to permit easy assembly and disassembly of the combustor liners.

A still further object is to provide a cross-ignition tube assembly which can be installed or withdrawn without requiring access to the space between combustors.

Other objects and advantages will become apparent from the following description taken in connection with the accompanying drawings, in which Fig. 1 illustrates a partial sectional view of a combustion system showing the cross-ignition tube mounted in place between adjacent combustors;

Fig. 2 is a section taken on the plane 2—2 of Fig. 1;

Fig. 3 is a view showing the cross-ignition tube held in a retracted position by a special tool devised for this purpose;

Fig. 4 is a perspective view of the tool; and

Fig. 5 is a partial sectional view taken on the plane 5—5 of Fig. 3.

Generally stated, the invention is practiced by providing a cross-ignition tube assembly consisting of telescoped tubes resiliently biased into positive engagement with adjacent combustors to prevent the tubes from "chattering," which construction permits the tubes to be readily retracted out of contact with the combustor by a special tool and maintained in the retracted position to facilitate easy removal of the combustors.

Referring to Fig. 1, there is illustrated a partial sectional view of combustors 1, 2 with a cross-ignition tube assembly 13 located therebetween. Each of the combustors 1, 2 includes a substantially cylindrical outer housing 4 and disposed coaxially therein a cylindrical liner structure 3 defining the combustion space and mounted in any suitable manner from the outer housing to define an annular air supply passage 4a. The mechanical details of the liner and related structure may be in accordance with those shown in U. S. Patent 2,601,000, issued to A. J. Nerad, June 17, 1952 and assigned to the assignee of the present application.

The outer housings 4, 10 of the adjacent combustors 1, 2 are formed with aligned openings 6, 8 respectively. The liners 3, 9 are formed with flanged circular ports 5, 7 respectively aligned with the axis of openings 6, 8. The openings 6, 8 are larger than ports 5, 7 for reasons which will be apparent later.

The cross-ignition tube assembly interconnects the openings 5, 7 in the liners 3, 9 respectively. The assembly consists of a thin-walled tube 11 which extends through opening 6 in housing 4, opening 5 in liner 3 and which has a flange portion 11a that contacts the flange 3a surrounding the port 5 to properly locate the tube 11 relative to the liner 3. A second thin-walled tube 12 having an inner diameter substantially equal to the outer diameter of tube 11 is telescoped over tube 11 and extends through housing opening 8 into communication with port 7 in liner 9. Tube 12 has a flange portion 12a which contacts flange 9a surrounding port 7 to limit the movement of tube 12 into the liner 9. The tubes 11, 12 have annular members 15, 16 secured by welds 19, 20 to substantially close the openings 6, 8 in the outer housings 4, 10 respectively to prevent the entrance of air into the annular air passages 4a, 10a. The end portion of the tube 11 which is inside of tube 12 is split as indicated at 11b and spread out; and, likewise, the end of tube 12 which is outside tube 11 is split as indicated at 12b and the "tongue" formed between the slits is bent inwardly to provide a snug frictional engagement between the tubes. This prevents any "chattering" in the event there is some looseness between the telescoped tube members.

A compression coil spring 18 is provided to bias the tubes 11, 12 into positive contact with the flange portions 3a, 9a of the liners 3, 9. The spring 18 is located between a spring abutment member 17 welded to tube 12 and diametrically opposite pins 14 extending through axially extending slots 12c (Fig. 2) in tube 12 and openings 11c in tube 11 (see Fig. 3). Two short pins 14 are used instead of a single transverse pin, to keep the bore of the telescoped tubes unobstructed, for reasons which will be apparent later. It is also to be noted that this pin and slot construction prevents the tubes from rotating relative to each other while permitting them to move axially relative to each other by a limited amount.

Referring now to Fig. 4, there is illustrated a tool 30 which can be used to maintain the tube assembly in a retracted position, in the manner shown in Fig. 3. The tool consists of a tubular member 30 having diametrically disposed hook portions 30a at one end and a single hook member 30b at its opposite end. The overall width of the hook portions 30a is slightly less than the outer diameter of tube 12, as can be seen in Fig. 5.

The cross-ignition tube assembly is assembled and retracted in the following manner.

After the complete combustor 1 and the outer housing 10 of combustor 2 are located in place, the cross-ignition tube assembly is inserted through opening 8 in air casing 10 with the tube 11 extending through opening 6 in housing 4 and opening 5 in liner 3 with the collar 11a contacting the flange 3a. The annular member 15 blocks off the flow of air into the annular air passage 4a. The tool 30 is then inserted into the telescoped tubes 11, 12 with the hooks 30a located in contact with tube 12, as in Fig. 5. The tool 30 and tube 12 may then conveniently be biased upwardly against spring 18 into the retracted position by a screw-driver 31 or other equivalent means inserted in the bore of tool 30 as shown in Fig. 3, until the bottom of tube 12 is substantially in alignment with the inner surface of housing 10. When this position is reached, the hook 30b of tool 30 projects from the end of tube 11, and the tool is then tilted to move hook 30b transversely into contact with liner 3 to latch the tube 12 in the retracted position. The screw-driver 31 is then removed, leaving the tool 30 holding the cross-ignition tube assembly in the condition shown in Fig. 3. The liner 9 can then be inserted axially from the left into air casing 10, and the tool 30 removed to permit the tube 12 to be biased by spring 18 into contact with liner 9. This may be done by re-inserting the screw-driver through liner opening 7, as shown in Fig. 3, tilting the tool member 30 to disengage the hook 30b from liner 3, and withdrawing both screw-driver 31 and tool 30 through openings 8, 7.

When it is desired to remove either of the liners 3 or 9, the end caps 3b or 9b may be removed and the cross-ignition tube retracted and maintained out of contact with the liner being removed in the manner above described. It is to be noted that the cross-ignition tube assembly can thus be installed and removed with the only access to the space between casings 4, 10 being that afforded by the aligned openings 7, 8, 6, 5 through which the tube assembly extends. This is important if the space between combustors is obstructed by members such as the apertured wall 1a.

Thus, it can be seen that the invention provides a cross-ignition tube assembly which is secured in place by being positively biased into contact with the adjacent combustors to prevent "chattering," without any auxiliary fastening devices, and which can be instantly retracted and maintained in a position to permit removal of the combustor liners, without access to the space between combustors being required.

It will be apparent to those skilled in the art that nubers changes and substitutions of mechanical equivalents might be made in the construction and assembly of the cross-ignition tube assembly.

It is, of course, desired to cover by the appended claims all such modifications as fall within the true spirit and scope of the invention.

What I claim as new and desire to secure by Letters Patent of the United States is:

1. In a combustion system for a thermal powerplant comprising a first combustor having an outer housing surrounding and spaced from a combustion chamber liner defining aligned lateral openings facing similar openings in the outer housing and combustion chamber liner of an adjacent similar combustor, conduit means interconnecting adjacent combustors through said aligned openings and comprising a pair of tube members in telescoped relation each having an end portion contacting a portion of one of the adjacent combustors surrounding a lateral opening, and means resiliently biasing said tubes in opposite directions into contact with said combustor portions, whereby they are resiliently retained in position and prevented from chattering.

2. A cross-ignition tube assembly connecting adjacent combustion chamber liners in a combustion system for a thermal powerplant, the adjacent liners defining aligned lateral openings, said ignition tube assembly comprising a pair of tube members in telescoped relation each having an end portion contacting a portion of one of the adjacent liners surrounding a lateral opening, and means resiliently biasing said tubes in opposite directions into contact with said liner portions, whereby they are resiliently retained in position and prevented from chattering.

3. A cross-ignition tube assembly for interconnecting adjacent combustion chambers in a combustion system of a thermal powerplant, which adjacent combustion chambers define aligned openings receiving the tube assembly, the tube assembly comprising telescoped tubes each having an end portion extending into a combustion chamber opening and a flange portion contacting the respective combustion chambers, spring abutment means secured to each of said telescoped tubes, and a compression spring disposed between said spring abutment means for biasing the tubes in opposite directions into positive contact with the adjacent combustion chambers whereby the tubes are resiliently retained in position and prevented from chattering.

4. In a combustion system for a thermal powerplant comprising a first combustor having an outer housing surrounding a radially spaced combustion chamber liner defining aligned lateral openings which are in alignment with similar aligned lateral openings in an outer housing and liner of an adjacent combustor, a cross-ignition tube assembly interconnecting the adjacent combustion chambers, said tube assembly comprising telescoped tubes each having an end portion extending into the aligned opening defined by one of the combustion chambers and a flange portion contacting the respective combustion chamber liner, spring abutment means secured to said tubes, said abutment means comprising an abutment member secured to the outside of one tube and a pin means located in openings defined by the other tube and extending through diametrically opposite axially extending slots defined by said first tube, the pin means comprising two separate pins extending through the tube wall portions on diametrically opposite sides of the tubes whereby the center portion of the tube is unobstructed to permit insertion of a tool to move and maintain the tube assembly in a retracted position, and a compression spring located between said spring abutment means for biasing the tubes in opposite directions into contact with the adjacent combustion chambers whereby the tubes are prevented from chattering.

5. A cross-ignition tube assembly for combustion apparatus having first and second adjacent combustors each comprising an outer housing surrounding and spaced from an inner liner member, adjacent combustors defining aligned openings in said outer housings and inner liners, the openings in the liners being of a substantially smaller diameter than the openings in the outer housings, said ignition tube assembly comprising a first tube member having a first end portion defining an annular shoulder engaging the periphery of the opening in the liner of said first combustor, the first tube having also adjacent said first end a radially extending flange member substantially closing the opening in the outer housing of said first combustor when in assembled relation, a second tube member having a cylindrical portion coaxially surrounding a portion of said first tube member in telescopic relation, said second tube member having also a reduced diameter end portion substantially equal in diameter to the first end portion of said first tube member and having an extreme end portion adapted to engage the periphery of the opening in the liner of said second combustor, the second tube member having also a flange portion spaced from said reduced diameter end portion and substantially closing the opening in the outer housing of the second combustor when in assembled relation, a compression spring surrounding the tube assembly and engaging portions of the first and second tube members to bias them in opposite directions, whereby the remote end portions of the first and second tube members may be resiliently biased into engagement with the respective combustor liners, and interengaging stop means limiting the extent to which the compression spring can bias the first and second tube members apart.

References Cited in the file of this patent

UNITED STATES PATENTS

| | | |
|---|---|---|
| 2,679,136 | Gaubatz | May 25, 1954 |
| 2,729,938 | McDowall et al. | Jan. 10, 1956 |
| 2,748,458 | Knudsen et al. | June 5, 1956 |
| 2,766,515 | Wise | Oct. 16, 1956 |